Aug. 22, 1939.  M. G. WHITFIELD  2,170,361

METHOD OF MAKING DUCTILE LAMINATED METAL

Filed April 4, 1938

Inventor
Marshall G. Whitfield
By Cameron, Kerkam & Sutton
Attorneys

Patented Aug. 22, 1939

2,170,361

UNITED STATES PATENT OFFICE 2,170,361

METHOD OF MAKING DUCTILE LAMINATED METAL

Marshall G. Whitfield, Knoxville, Tenn., assignor to Reynolds Metals Company, New York, N. Y., a corporation of Delaware Application April 4, 1938, Serial No. 200,003

7 Claims. (Cl. 148—12)

This invention relates to a method of producing ductile laminated metal, and more particularly to the production of a ductile aluminum-coated iron or steel.

A method has heretofore been evolved whereby an iron or steel core member, usually in the form of a wire or strip, may be coated with a relatively thin layer of aluminum which is intimately bonded to the core by reason of the establishment of an iron-aluminum alloy bond therebetween. As is recognized in the art, iron-aluminum alloy is harder and more brittle than either of its component metals, and therefore the presence of the iron-aluminum bond has resulted in decreased ductility of the resultant product. In order to minimize this reduction in ductility because of the presence of the alloy bond a procedure has been evolved whereby this bond may be made relatively thin and of substantially uniform thickness, but even so the resultant product has not attained the desired degree of ductility.

I have discovered that, by subjecting the aluminum-coated iron or steel to a reduction in cross section by rolling up to at least a certain critical value and thereafter annealing the same as hereinafter described, the resultant product can be rendered as ductile as the component core and coating metals, so that it may be drawn and bent, even into pinched bends and then straightened out, without rupturing the laminated metal or causing separation of the aluminum coating from the iron or steel core.

It is therefore an object of this invention to provide a method of treating aluminum-coated iron or steel so as to increase its ductility.

Another object of this invention is to provide a method of the type characterized which results in a relatively ductile laminated metal that can be drawn, bent and subjected to other shaping and fabricating operations without breaking the coating or causing the coating to separate from the core. Other objects will appear as the description of the invention proceeds.

In accordance with the preferred procedure the iron or steel core, preferably of low carbon steel, is suitably coated by passing the same through a bath of molten aluminum, the coating in the preferred practice of the invention being on the order of two and one-half thousandths of an inch in thickness. By suitably controlling the temperature, rate of movement, time of quenching, etc., as disclosed in the application of Whitfield and Sheshunoff, Serial No. 85,798, filed June 17, 1936, a substantially uniform and relatively thin iron-aluminum bond is established between the two metals, the iron-aluminum alloy layer being ordinarily on the order of one-half thousandth of an inch in thickness. Experience has demonstrated that a laminated metal so formed has the aluminum intimately and uniformly bonded to the iron or steel core, but as the alloy bond is less ductile than the component metals the laminated metal, if subjected to drawing, bending or other severe working operations that introduce sharp bends or the like, may crack owing to the lesser ductility of the alloy layer. I have discovered that the laminated metal so formed or formed in any other suitable way may be rendered substantially as ductile as the component metals by proceeding as follows, the invention being described as applied to the treatment of a strip coated on one or both sides, but it is to be expressly understood that the invention may be equally applied to coated wire and other forms:

The laminated metal is subjected to a plurality of rolling operations whereby the metal is reduced in cross section by at least 35% to 40%, and preferably by about 50%, after which the reduced metal is subjected to an annealing operation at a temperature on the order of 1000° F., but depending somewhat upon the character of the iron or steel used as the core metal.

The reduction in cross section is preferably effected by at least two rolling operations, and desirably by at least three rolling operations. The rolling may be carried out at any suitable temperature, preferably at a temperature that will not materially increase the dispersion of the component metals, that is materially below 1000° F. The first rolling operation should reduce the cross section by an amount on the order of 15%. This may be followed by a second rolling operation which reduces the cross section by a further amount on the order of 20% to 25% of the original thickness, but I preferably use two succeeding rolling operations each on the order of from 15% to 20% of the original thickness. It is to be expressly understood, however, that while the minimum total reduction of from 35% to 40% appears to be critical, the percentage reductions as heretofore effected by each of the successive rolling operations given are not critical except that the rate of reduction must not be so large as to unduly pulverize the alloy layer as will appear from the following discussion. Thus a larger number of reductions of smaller extent may under some circumstances be considered desirable.

Following the final reduction the rolled metal is subjected to an annealing operation which may be varied to some extent depending upon the character and composition of the iron or steel core, but annealing at a temperature on the order of 1000° F. has been found to provide the desired ductility of the laminated metal.

I have found that a reduction in thickness of at least 35% to 40% appears to be a critical value below which the novel results of the present process cannot be obtained. The extent of reduction beyond that value may be varied depending upon the use to which the metal is to be put, the characteristics desired and other factors, but I prefer the reduction to be on the order of 50%.

Photomicrographic studies of the various stages of the procedure indicate that a relatively severe rolling operation which reduces the thickness by approximately 15% results in a breaking of the alloy layer into a plurality of blocks which become separated during the succeeding rolling operations followed by a rotation of said blocks about axes generally at right angles to the direction of rolling, so that said relatively hard alloy blocks become embedded in the core and coating metals along angular edges so that they operate as spaced keys interlocking the core and coating metals. At the same time the coating and base metals are forced into and fill the spaces between the separated and rotated blocks.

If the reduction is so severe as to pulverize the alloy layer the desired results are not attained, and the coating metal is liable to strip from the core metal. But by proceeding as above explained, the resulting product is found to be substantially as dutcile as the component metals, so that the laminated metal may be given sharp bends, drawn, and otherwise subjected to fabricating operations heretofore considered impossible without danger that the laminated metal will rupture or the coating metal become separated from the core metal.

The accompanying drawing illustrates diagrammatically the successive steps in a procedure employing three rolling operations as above outlined:

In each of the views the core metal is designated 10 and the aluminum coating layer is designated 11.

Figure 1:
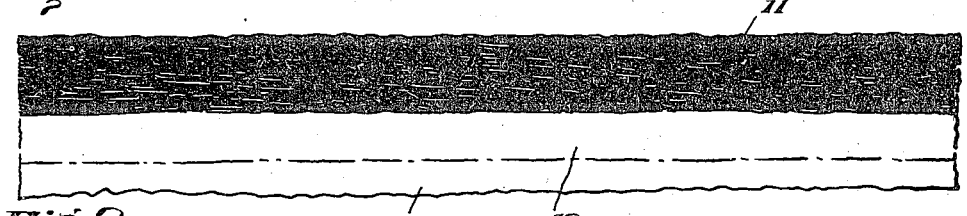
Fig. 1 is a diagrammatic view of the laminated metal before treatment in accordance with the present invention.

In Fig. 1 the alloy layer 12 is indicated by the parallel lines lying between the core metal 10 and coating metal 11.

Figure 2:
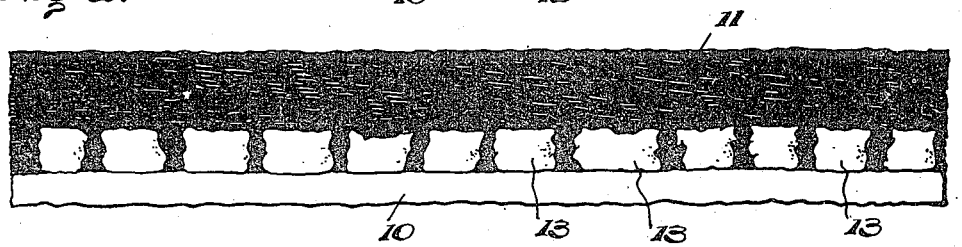
Fig. 2 is a diagrammatic view of the laminated metal after the first rolling operation.

Fig. 2 illustrates the product at the end of the first pass through the rolls wherein there has been a reduction on the order of 15%. As here shown the alloy layer 12 has broken up into a plurality of blocks 13.

Figure 3:
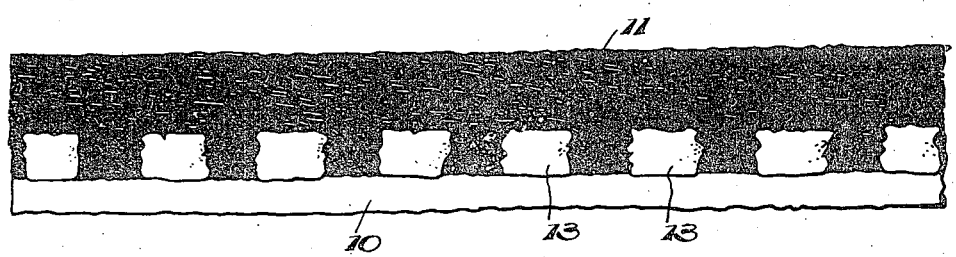
Fig. 3 is a diagrammatic view of the laminated metal after the second rolling operation.

Fig. 3 illustrates the laminated metal after a further rolling operation providing a reduction on the order of 15%, and as here shown the blocks 13 have been separated and the coating metal has been forced into the spaces therebetween. In practice some slight tendency toward rotary movement of the component blocks 13 may be observed under the microscope at this stage, but until the reduction has proceeded to at least 35% to 40%, no marked rotation of the blocks is noticeable.

Figure 4:
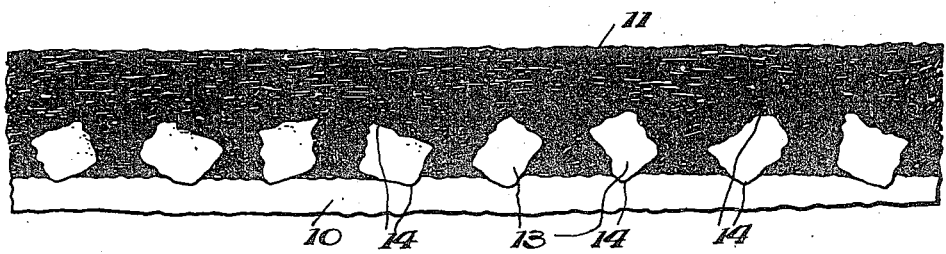
Fig. 4 is a diagrammatic view of the laminated metal after the third rolling operation.

As shown in Fig. 4, however, following the third rolling operation, the blocks 13 have been rotated to different extents, some as much as 90° while others perhaps no more than 45° to 60°, but a large percentage if not all of the blocks have been rotated through a substantial angle, as shown in this figure, so that they constitute a plurality of keys whose angles 14 have been forced into and embedded in the core and coating metals.

Figure 5:
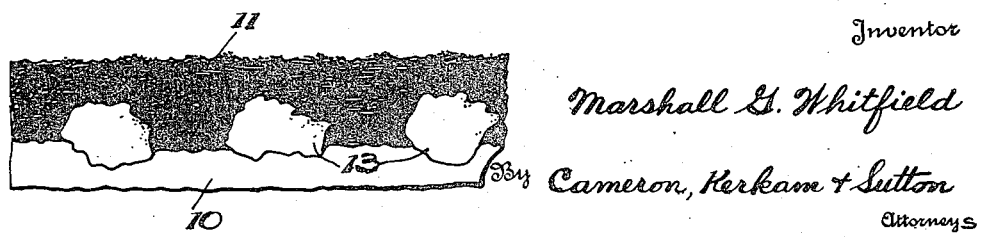
Fig. 5 is a fragmentary enlarged view taken from a micrograph to illustrate observed conditions in the ultimate product.

Fig. 5 illustrates on an enlarged scale what has been shown diagrammatically in Fig. 4, this view having been taken from a micrograph which shows that the blocks 13, while not possessing the relatively regular configuration indicated in the diagrammatic views above referred to, have generally the form of blocks as heretofore referred to and these blocks have been rotated to various extents whereby they became embedded in the core and coating metals.

It will therefore be perceived that the present invention provides a method for treating aluminum coated iron or steel whereby the resultant product may be rendered as ductile as the component metals. The foregoing procedure enables the laminated metal to be given relatively sharp bends and otherwise severely worked without the alloy layer causing rupture because said layer is separated into a large number of relatively small separated blocks between which is ductile metal. At the same time the rotation of said blocks and their interlocking with the core and coating metals provide for a secure adherence of the coating to the core metals so that likelihood of separation therebetween is substantially eliminated.

While the invention has been described as applied to aluminum-coated iron or steel it is also available for use with other laminated metals where an alloy bonding layer is established between the two and said alloy layer is less ductile than the component metals. Therefore, the invention is not to be limited solely to the treatment of aluminum-coated iron or steel, but reference is to be had to the appended claims for a definition of the invention.

What is claimed is:

1. The method of treating aluminum-coated ferrous metal which includes the steps of rolling the same at a temperature below that at which there is a material increase in the dispersion of the component metals to reduce its thickness by more than 35%, and thereafter annealing the laminated metal.

2. The method of treating aluminum-coated ferrous metal which includes the steps of subjecting the same to a plurality of rolling operations at a temperature below that at which there is a material increase in the dispersion of the component metals which rolling operations together reduce the thickness of the laminated metal by more than 35%, and thereafter annealing the laminated metal.

3. The method of treating aluminm-coated ferrous metal which includes the steps of subjecting the same to rolling at a temperature below that at which there is a material increase in the dispersion of the component metals to reduce its thickness by approximately 50%, and thereafter annealing the laminated metal.

4. The method of treating aluminum-coated ferrous metal which includes the steps of subjecting the same to a plurality of rolling operations at a temperature below that at which there is a material increase in the dispersion of the component metals each of which rolling operations reduces the thickness of the laminated metal on the order of from 15% to 20% of its original thickness, and thereafter annealing the laminated metal.

5. The method of treating aluminum-coated ferrous metal which includes the steps of subjecting the same to at least three rolling operations at a temperature below that at which there is a material increase in the dispersion of the component metals which rolling operations together reduce the thickness of the laminated metal by more than 35% of its original thickness, and thereafter annealing the laminated metal.

6. The method of treating aluminum-coated ferrous metal having an intermediate iron-aluminum alloy layer which includes the steps of subjecting the same to a plurality of rolling operations at a temperature below that at which there is a material increase in the dispersion of the component metals which rolling operations are sufficiently drastic to break up the iron-aluminum alloy layer into a plurality of blocks and rotate a substantial number of the blocks to embed the same in the laminations, and thereafter annealing the laminated metal.

7. A method of rendering ductile an aluminum-coated ferrous metal whose aluminum-coating is bonded to its ferrous core by an alloy bond, which method includes the steps of subjecting the laminated metal to a plurality of rolling operations at a temperature below that at which there is a material increase in the dispersion of the component metals which rolling operations successively break the alloy layer into blocks and separate the same and then rotate a substantial number of said blocks to embed the same in the laminations.

MARSHALL G. WHITFIELD.